United States Patent
Petersson

(10) Patent No.: US 8,602,150 B2
(45) Date of Patent: Dec. 10, 2013

(54) MOTOR-DRIVEN VEHICLE

(75) Inventor: Martin Petersson, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/618,123

(22) Filed: Sep. 14, 2012

(65) Prior Publication Data

US 2013/0075178 A1 Mar. 28, 2013

(30) Foreign Application Priority Data

Sep. 27, 2011 (JP) ................... 2011-211123

(51) Int. Cl.
*B60K 11/00* (2006.01)

(52) U.S. Cl.
USPC ..................................... 180/220; 180/68.1

(58) Field of Classification Search
USPC ............... 180/68.1, 68.2, 220, 68.5; 296/78.1
See application file for complete search history.

(56) References Cited

U.S. PATENT DOCUMENTS

| | | | |
|---|---|---|---|
| 5,657,830 A * | 8/1997 | Kawashima et al. | 180/220 |
| 7,556,115 B2 * | 7/2009 | Iwanaga | 180/229 |
| 7,778,028 B2 * | 8/2010 | Tanabe et al. | 361/690 |
| 2012/0312609 A1 | 12/2012 | Takewaka et al. | |

FOREIGN PATENT DOCUMENTS

| | | |
|---|---|---|
| EP | 0469995 A1 | 2/1992 |
| JP | 2009-078623 A | 4/2009 |
| WO | 2011/105356 A1 | 9/2011 |

* cited by examiner

*Primary Examiner* — J. Allen Shriver, II
*Assistant Examiner* — Felicia L Brittman
(74) *Attorney, Agent, or Firm* — Birch, Stewart, Kolasch & Birch, LLP

(57) ABSTRACT

A cowl covers a steering handle and a body frame from upper and front sides of the steering handle to the right and left sides of the body frame. The cowl is mounted to the body frame. The cowl includes an upper portion for covering the upper side of the steering handle and a screen mounting recess opened at its rear end. A windscreen inclined rearwardly and upwardly is mounted to the screen mounting recess. Side surfaces of the cowl are each provided with an air guide groove wherein an airflow is directed toward the airflow guiding-in port while being straightened. In addition, slits through which the airflows are directed to upper portions of the airflow guiding-in ports are each provided between those opposed edge portions of the windscreen and the cowl which front on the screen mounting recess. The battery is cooled without depending on an electric fan.

19 Claims, 7 Drawing Sheets

MOTOR-DRIVEN VEHICLE

CROSS-REFERENCE TO RELATED APPLICATIONS

The present application claims priority under 35 USC 119 to Japanese Patent Application No. 2011-211123 filed Sep. 27, 2011 the entire contents of which are hereby incorporated by reference.

BACKGROUND OF THE INVENTION

1. Field of the Invention

The present invention relates to an improvement in a motor-driven vehicle including a front fork that is provided at its upper end with a steering handle. The front fork supports a front wheel. A body frame steerably supports the front fork. A rear wheel is supported on the body frame. An electric motor is provided for driving the rear wheel. A battery is provided for supplying the electric motor with electric power. A battery cover covers an upper side and right and left sides of the battery with the electric motor and the battery and the battery cover being mounted on the body frame. Side walls of the battery cover are each provided with an airflow guiding-in port through which an airflow induced by operation of the vehicle is guided in and supplied to the peripheries of the battery.

2. Description of Background Art

In conventional motor-driven vehicles, a configuration is often adopted in which the airflow is guided directly into airflow guiding-in ports at side surfaces of the battery cover. In such a structure, however, the efficiency of guiding-in of the airflow is low. Therefore, it is a common practice to arrange inside the battery cover an electric fan by which the airflow is drawn in. The arrangement of the electric fan, however, not only increases the load on the battery but also leads to an enlarged battery cover, an increased number of component parts, and an increased weight and cost, which naturally are undesirable. See, for example, Japanese Patent Laid-Open No. 2009-78623.

SUMMARY AND OBJECTS OF THE INVENTION

The present invention has been made in consideration of the above-mentioned circumstances. Accordingly, it is an object of an embodiment of the present invention to provide a motor-driven vehicle in which an airflow can efficiently be guided into the inside of a battery cover to cool the battery, without depending on an electric fan.

In order to attain the above object, according to an embodiment of the present invention, there is provided a motor-driven vehicle including a front fork that is provided at a top end thereof with a steering handle for supporting a front wheel. A body frame steerably supports the front fork. A rear wheel is supported on the body frame. An electric motor is provided for driving the rear wheel with a battery for supplying the electric motor with electric power. A battery cover covers an upper side and right and left sides of the battery, with the electric motor and the battery and the battery cover being mounted on the body frame. Side walls of the battery cover are each provided with an airflow guiding-in port through which an airflow induced by operation of the vehicle is guided in and supplied to peripheries of the battery. A cowl is provided for covering the steering handle and the body frame over a range from the upper and front sides of the steering handle to right and left sides of the body frame. The cowl is mounted to the body frame. The cowl includes an upper portion covering the upper side of the steering handle with a screen mounting recess opened at its rear end. A windscreen inclined rearwardly upward is mounted to the screen mounting recess. Side surfaces of the cowl are each provided with an air guide groove by which the airflow is directed toward the airflow guiding-in port while being straightened. Slits, wherein the airflow is directed toward upper portions of the airflow guiding-in ports, are each provided between those opposed edge portions of the windscreen and the cowl which front on the screen mounting recess. In addition, the battery corresponds to the first battery 10 in an embodiment of the present invention which will be described later, and the airflow guiding-in ports correspond to the first airflow guiding-in ports 22.

Further, the motor-driven vehicle according to an embodiment of the present invention includes a front surface of the battery cover that is provided with a second airflow guiding-in port through which the airflow is guided in and supplied to peripheries of a front surface of the battery. A front end wall of the cowl is provided with an airflow intake port by which the airflow is taken in and directed toward the second airflow guiding-in port. In addition, the second airflow guiding-in port corresponds to the second airflow guiding-in port 23 in the embodiment of the present invention which will be described later.

According to an embodiment of the present invention, the battery cover is provided in a rear portion thereof with an exhaust port through which the airflow guided in to the peripheries of the battery is permitted to flow out.

According to an embodiment of the present invention, the exhaust port is so formed that exhaust air flowing out therethrough is directed toward the electric motor.

According to an embodiment of the present invention, while the motor-driven vehicle is being operated, the airflow coming from the front side is guided to the airflow guiding-in ports in the battery cover side walls while being straightened, by the air guide grooves provided in the side walls of the cowl. Therefore, the airflows can be efficiently supplied to the inside of the battery cover, whereby the battery inside the battery cover can be cooled effectively. Moreover, at the upper portion of the cowl, the slits each opening between the cowl and the windscreen take in the airflow coming from the front side and direct the airflows toward the upper portions of the airflow guiding-in ports. As a result, the airflows veering from the air guide grooves toward the upper side of the airflow guiding-in ports are pushed in toward the airflow guiding-in ports on the lower side. Thus, the quantities of airflow guided from the air guide grooves into the airflow guiding-in ports can be increased. Therefore, a cooling effect on the battery can be enhanced. Accordingly, it is unnecessary to dispose an electric cooling fan, so that the motor-driven vehicle can be provided inexpensively.

According to an embodiment of the present invention, the airflow coming from the front side is taken in and directed toward the second airflow guiding-in ports in the battery cover front surface, by the airflow intake port opening in the front end wall of the cowl. Therefore, the cooling air impinges on the battery, particularly on the front surface of the battery, whereby the battery can be cooled effectively.

According to an embodiment of the present invention, the airflow having cooled the battery flows rearwardly through the inside of the battery cover and thereafter flows out via the exhaust port at the rear portion of the battery cover. Therefore, the airflow would not be stagnant inside the battery cover, so that the cooling effect on the battery can be enhanced.

According to an embodiment of the present invention, the exhaust port ensures that the airflow having cooled the battery can be utilized to cool the electric motor, as well. Therefore, the airflow can be efficiently utilized for cooling of the battery and the electric motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention applied to a motor-driven two-wheeled vehicle will be described below, based on the attached drawings.

Figure 1:
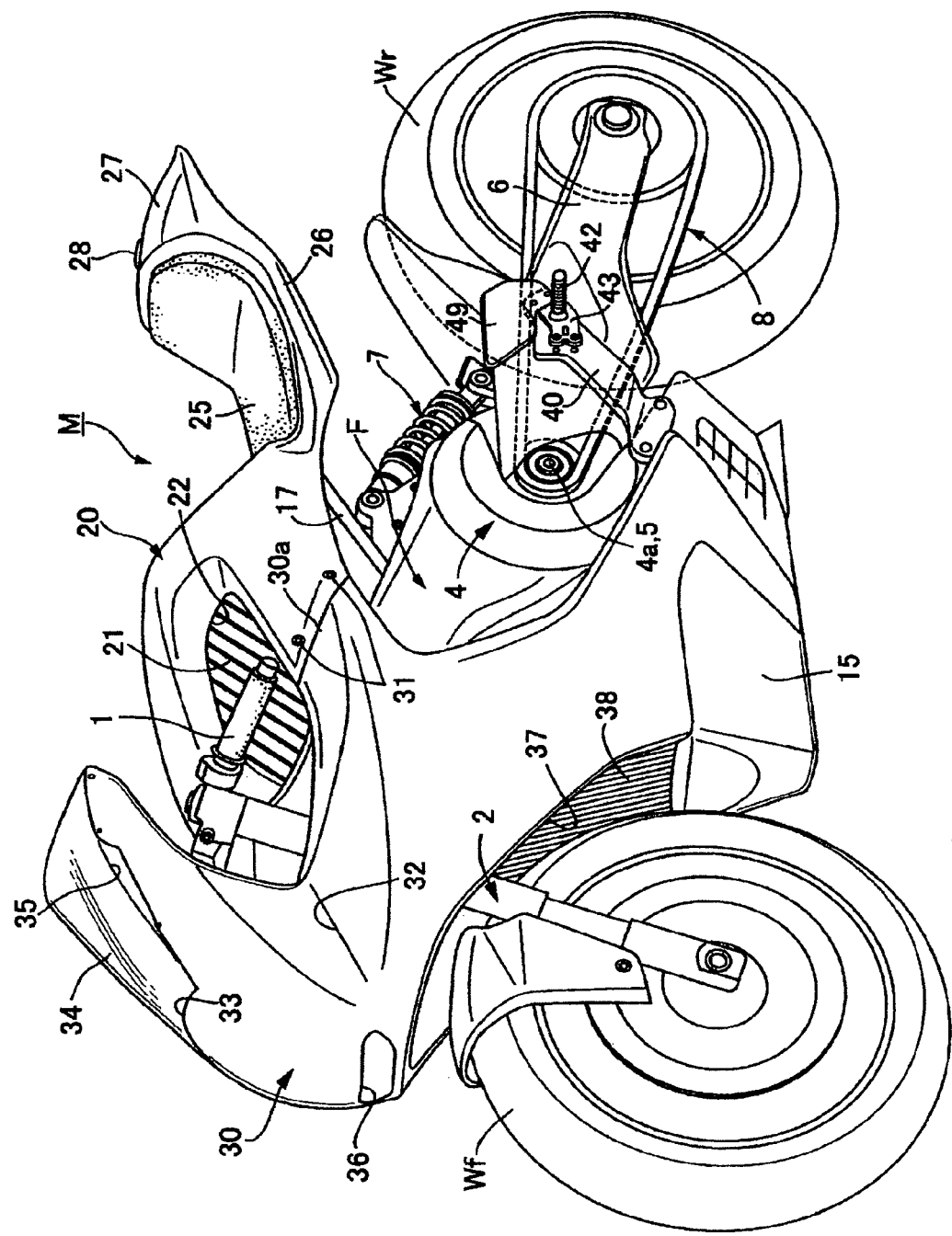
FIG. 1 is a perspective view of a motor-driven two-wheeled vehicle according to an embodiment of the present invention.
Figure 2:
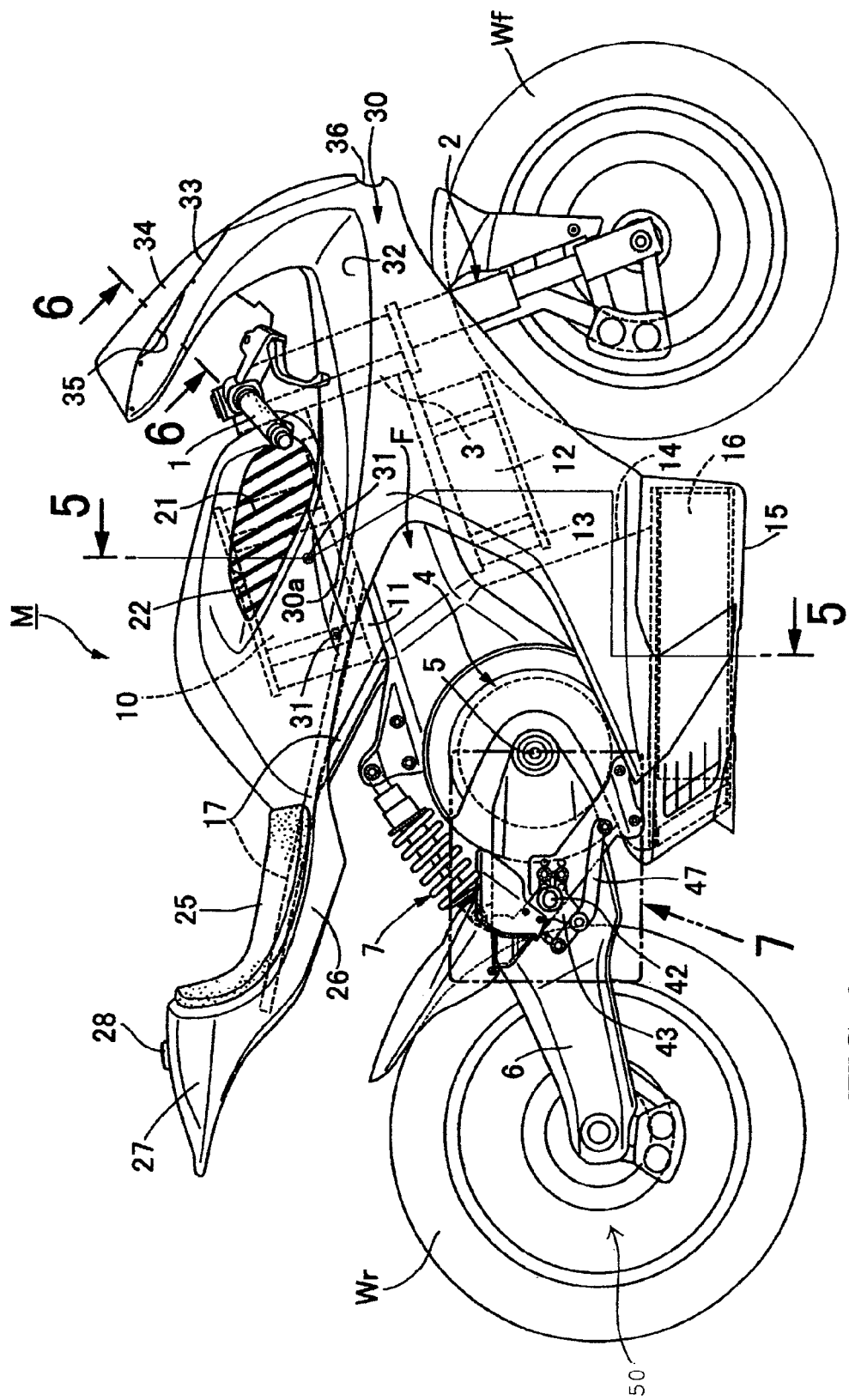
FIG. 2 is a right side view of the motor-driven two-wheeled vehicle.
Figure 3:
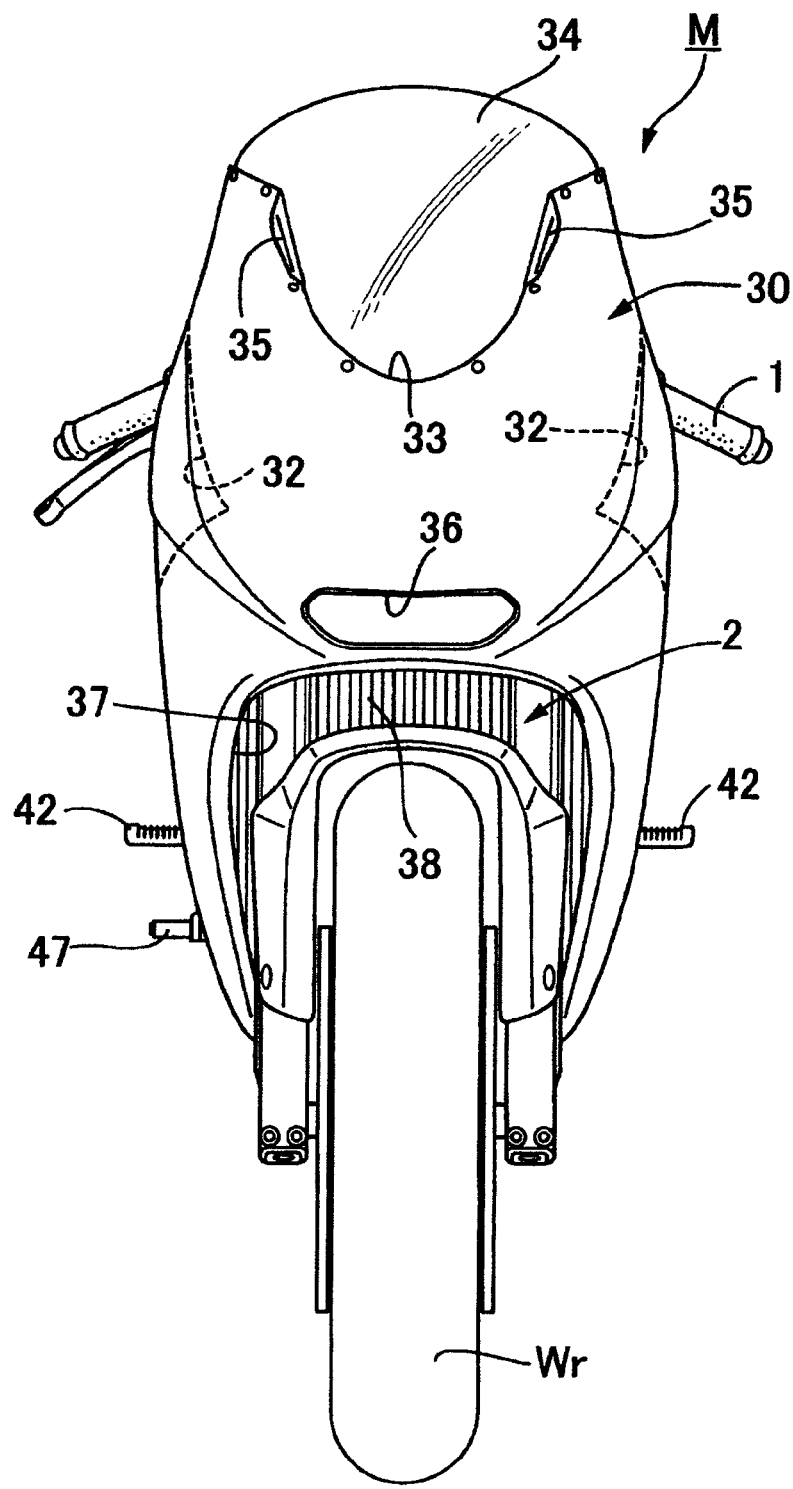
FIG. 3 is a front view of the motor-driven two-wheeled vehicle.

As illustrated in FIGS. 1 to 3, a motor-driven two-wheeled vehicle M includes a front fork 2 for rotatably supporting a front wheel Wf on its lower end portions and which is provided with a bar-shaped steering handle 1 at its upper end. A body frame F includes a front end portion with a head pipe 3 for steerably supporting the front fork 2. The body frame F extends in a rearwardly downward inclination. An electric motor 4 with an output shaft 4a disposed horizontally in the left-right direction is mounted to a rear end portion of the body frame F. A cantilever-type rear fork 6 is vertically swingably connected to the body frame F, through a pivot shaft 5 disposed coaxially with the output shaft 4a. A shock absorber 7 is interposed between the rear fork 6 and the body frame F.

A rear wheel Wr is rotatably supported on rear end portions of the rear fork 6, with power from the output shaft 4a being transmitted to the rear wheel Wr by a chain transmission device 8.

On an upper surface of the body frame F, a first battery 10 is held through a first battery holder 11. In addition, on a lower surface of the body frame F, a second battery 12 is held through a second battery holder 13.

Under the electric motor 4, an accessories box 15 is disposed which extends horizontally in the longitudinal vehicle direction and is supported on the body frame F and the electric motor 4 through a stay 14. In the accessories box 15, a driver unit 16 is positioned for controlling the supply of electric power from the first and second batteries 10 and 12 to the electric motor 4.

Figure 4:
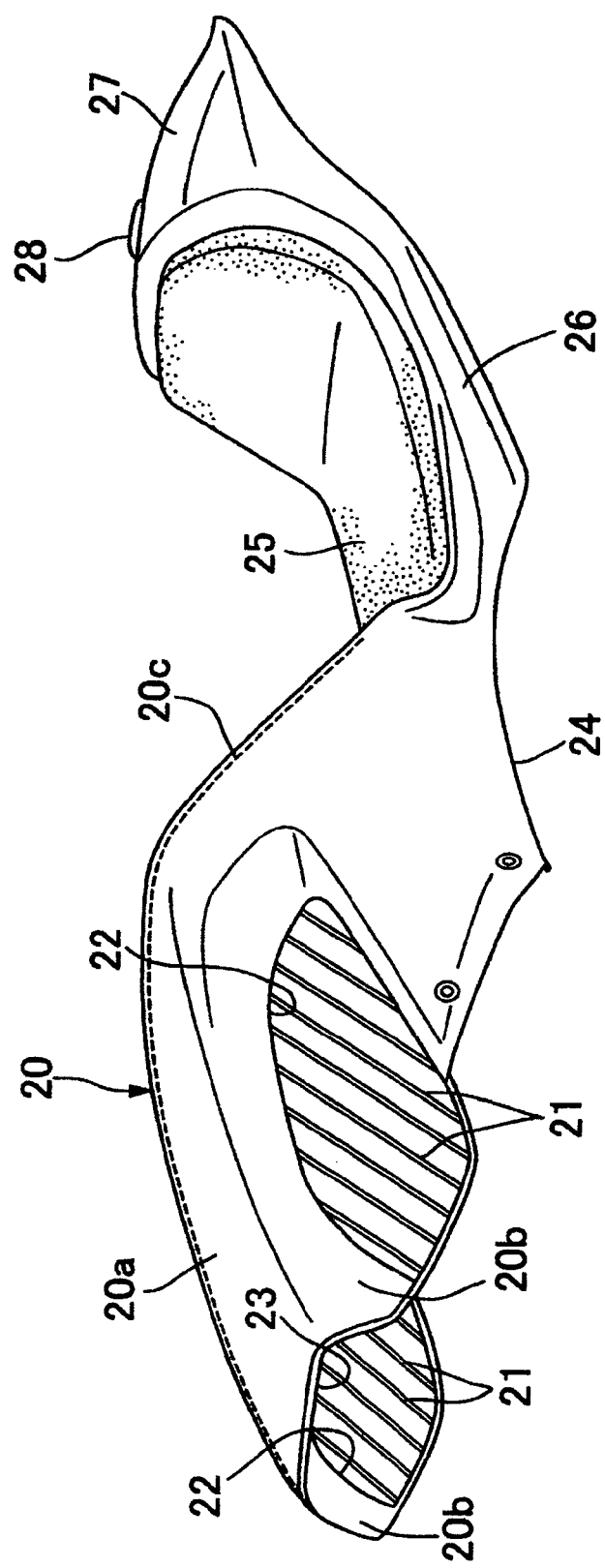
FIG. 4 is a perspective view of a battery cover and a seat holder assembly of the motor-driven two-wheeled vehicle.
Figure 5:
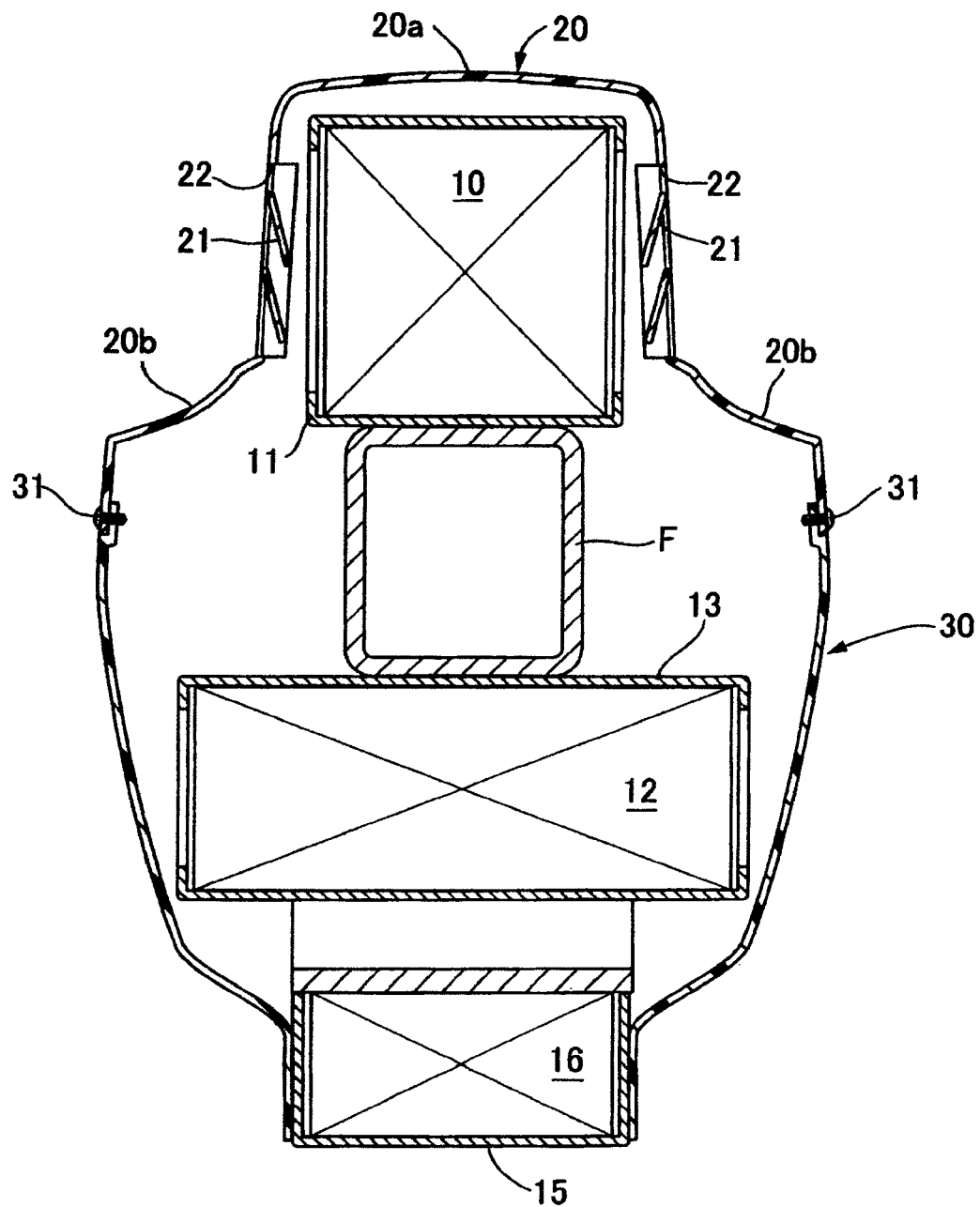
FIG. 5 is an enlarged sectional view taken along line 5-5 of FIG. 2.

As shown in FIGS. 2 and 4, a pair of right and left seat rails 17 extend rearwardly upwardly and continuously from an upper surface of an intermediate portion of the body frame F. A battery cover 20 for covering the first battery 10 over the range from the body frame F to the seat rails 17 is mounted to the body frame F. The battery cover 20 has an upper wall 20a, right and left side walls 20b, 20b and a rear wall 20c that are connected together continuously and integrally. The external appearance of the battery cover 20 is modeled after a fuel tank of an ordinary motorcycle of the type that is driven by an internal combustion engine.

At right and left side walls of the battery cover 20, first airflow guiding-in ports 22, 22 fitted with louvers 21 are provided, so as to be opened toward side surfaces of the first battery 10. In addition, the battery cover 20 is opened on the front side as a second airflow guiding-in port 23 opening toward the front surface of the first battery 10. Further, the battery cover 20 is opened on the rear lower side as an exhaust port 24 opening toward the electric motor 4. In this case, the rear wall 20c of the battery cover 20 is inclined rearwardly and downwardly so that the airflow going out via the exhaust port 24 is guided thereby toward the electric motor 4.

At the rear end of the battery cover 20, a seat holder 26 for supporting a seat 25 is provided in an integrally continuous manner. In turn, at the rear end of the seat holder 26, a rear cowl 27 is provided in an integrally continuous manner. A kill switch 28 by which the operation of the electric motor 4 can be stopped in an emergency is provided at an upper surface of the rear cowl 27. The seat holder 26 is mounted to the seat rails 17.

As shown in FIGS. 1 to 3 and 5, a cowl 30 is provided for covering the front side and the right and left sides of an upper portion of the front fork 2, the upper side of the steering handle 1, the right and left sides of a front portion of the body frame F, and the right and left sides of the accessories box 15. The cowl 30 is mounted to the body frame F.

Right and left side walls of the cowl 30 are provided with extension portions 30a, 30a that extend in the manner of being continuous with the right and left side walls of the battery cover 20 on the lower side of the first airflow guiding-in ports 22. These extension portions 30a, 30a are connected to the side walls 20b, 20b of the battery cover 20 by screws 31. The right and left side walls of the cowl 30 are provided with air guide grooves 32, 32 by which the airflows are directed toward the first airflow guiding-in ports 22, 22 while being straightened.

Figure 6:
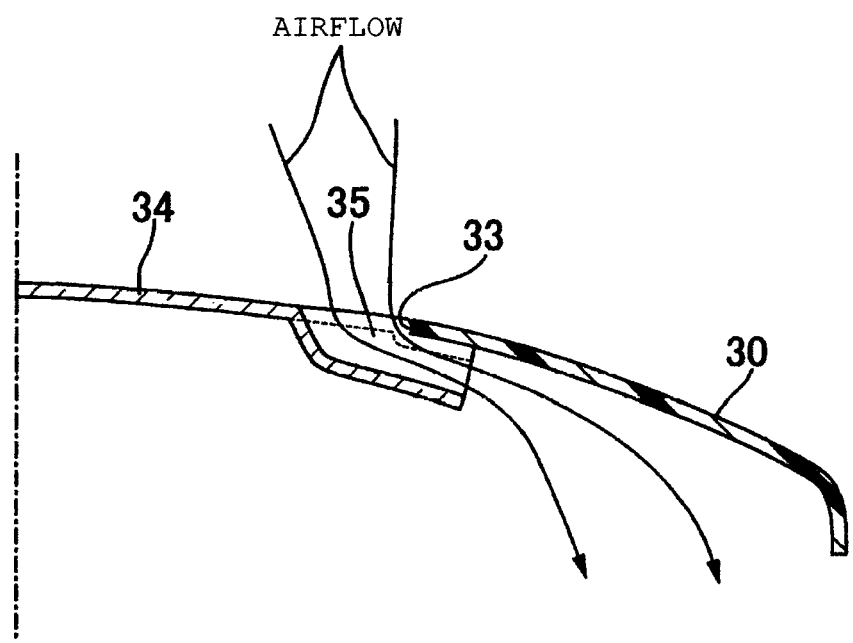
FIG. 6 is an enlarged sectional view taken along line 6-6 of FIG. 2.

As shown in FIGS. 3 and 6, the upper portion of the cowl 30 covers the upper side of the steering handle 1 and is provided with a screen mounting recess 33 opened at its rear end. A transparent windscreen 34 inclined rearwardly and upwardly is mounted to the screen mounting recess 33. A pair of slits 35, 35 by which the airflows are directed to upper portions of the first airflow guiding-in ports 22, 22 are each defined between those opposed edge portions of the windscreen 34 and the cowl 30 that front on the screen mounting recess 33.

Further, that front end wall of the cowl 30 that covers the front side of the steering handle 1 is provided with an airflow intake port 36 opening toward the second airflow guiding-in port 23.

Furthermore, on the lower front side of the cowl 30, an opening 37 fitted with a mesh screen 38 is provided through which the airflow is guided into the inside of the cowl 30 immediately rearwardly of the front wheel Wf. The opening 37 is by far greater than the airflow intake port 36 in aperture area.

Figure 7:
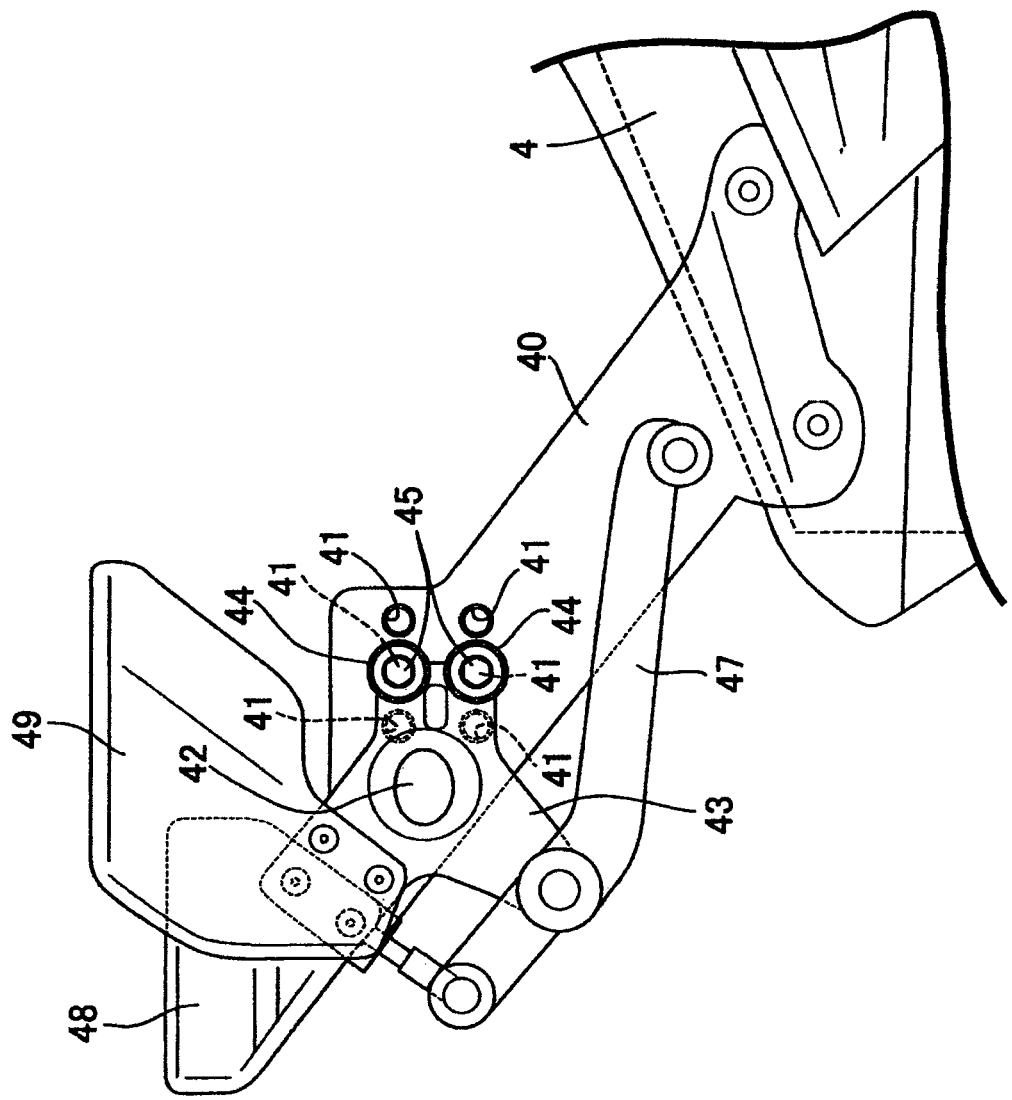
FIG. 7 is an enlarged view of part 7 of FIG. 2.

As shown in FIG. 7, footrest brackets 40 are connected by bolts to the right and left side surfaces of the electric motor 4. The footrest bracket 40 is provided with a plurality of pairs (in the example shown, three pairs) of upper and lower fixing holes 41, 41. The pairs are aligned with one another along the longitudinal vehicle direction. On the other hand, footrest holders 43 for supporting footrests 42 are each provided with a pair of upper and lower mounting bosses 44, 44 corresponding to the pair of upper and lower fixing holes 41, 41. The footrest holders 43 are fixed to footrest brackets 40 by connecting the mounting bosses 44, 44 to one of the plurality of pairs of fixing holes 41, 41 in a selective manner by bolts 45, 45. When the connecting positions between the mounting bosses 44, 44 and the pair of fixing holes 41, 41 are changed, the positions of the footrests 42 can be regulated along the longitudinal vehicle direction, together with the footrest holders 43. In addition, the plurality of pairs of fixing holes 41, 41 aligned along the longitudinal vehicle direction may be replaced by slots extending in the longitudinal vehicle direction. In this case, the positions of the footrest holders 43 and the footrests 42 can be regulated in a stepless (continuous) manner.

A brake pedal 47 is swingably and turnably supported on the footrest holder 43 on the right side. A rear master cylinder 48 actuated by the brake pedal 47 is also mounted to the footrest holder 43. The rear master cylinder 48 is used for operation of a disc brake 50 for the rear wheel Wr.

In addition, a protect cover 49 for restricting inward movement of an operators foot placed on the footrest 42 is firmly attached to the footrest holder 43.

Now, operation of the present embodiment will be described below.

While the motor-driven two-wheeled vehicle M is being operated, the airflow coming from the front side is guided to the first airflow guiding-in ports 22, 22 in the right and left side walls of the battery cover 20 while being straightened, by the air guide grooves 32, 32 provided at the right and left side surfaces of the cowl 30. Therefore, the airflows can be efficiently supplied to the inside of the battery cover 20, whereby the first battery 10 inside the battery cover 20 can be cooled effectively.

In addition, at the upper portion of the cowl 30, the pair of right and left slits 35, 35 each opening between the cowl 30 and the windscreen 34 take in the airflow coming from the front side, whereon they direct the airflows toward the upper portions of the first airflow guiding-in ports 22, 22 on the corresponding sides, correspondingly. As a result, the airflows veering from the air guide grooves 32, 32 toward the upper side of the first airflow guiding-in ports 22, 22 are pushed in toward the first airflow guiding-in ports 22, 22 on the lower side. Thus, the quantities of air (airflow) guided from the air guide grooves 32, 32 into the first airflow guiding-in ports 22, 22 can be increased. Accordingly, a cooling effect on the first battery 10 can be enhanced.

Further, the airflow intake port 36 opening in the front surface of the cowl 30 takes in the airflow coming from the front side, whereon it directs the airflow toward the second airflow guiding-in port 23 at the front surface of the battery cover 20. Therefore, the cooling air impinges on the first battery 10, particularly on the front surface of the first battery 10, whereby the first battery 10 can be cooled effectively.

The airflow having thus cooled the first battery 10 flows rearward through the inside of the battery cover 20, then impinges on the rear wall 20c, and flows out via the exhaust port 24 on the lower side. Therefore, the airflow is not be stagnant inside the battery cover 20, so that the cooling effect on the first battery 10 can be enhanced.

Moreover, the exhaust port 24 ensures that the exhaust air flowing out therethrough is thereby directed toward the electric motor 4. Accordingly, cooling of the electric motor 4 can also be achieved by utilizing the exhaust air.

Furthermore, the opening 37 opening to the lower front side of the cowl 30, upon taking in a large quantity of air (airflow) coming from the front side, directs the airflow toward the second battery 12 supported on the lower surface of the body frame F. Therefore, the second battery 12 can be cooled by the large quantity of air (airflow). Moreover, since the electric motor 4 is disposed rearwardly of the second battery 12, the electric motor 4 can be effectively cooled by the large quantity of air (airflow) having cooled the second battery 12.

In addition, to the lower end of the cowl 30, the horizontally disposed accessories box 15 is connected which extends from the lower end of the opening 37 toward the lower side of the electric motor 4. Further, the driver unit 16 for controlling the driving of the electric motor 4 is positioned and held in the accessories box 15. Therefore, the airflow entering the opening 37 passes toward the electric motor 4 side while being straightened by the upper surfaces of the accessories box 15 and the driver unit 16. Accordingly, the driver unit 16 and the electric motor 14 can be effectively cooled.

Thus, there is no need to dispose a special electric cooling fan. Accordingly, the motor-driven two-wheeled vehicle M can be provided inexpensively.

While an embodiment of the present invention has been described above, the invention is not restricted to the above embodiment, and various design modifications are possible within the scope of the gist of the invention. For instance, the present invention can be applied also to an electric three-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor-driven vehicle comprising:
a front fork for supporting a front wheel with a steering handle being mounted on a top end thereof;
a body frame wherein the front fork is steerably supported;
a rear wheel supported on the body frame;
an electric motor for driving the rear wheel; a battery for supplying the electric motor with electric power; a battery cover for covering an upper side and right and left sides of the battery, with the electric motor and the battery and the battery cover being mounted on the body frame;
an airflow guiding-in port being provided in each of right and left side walls of the battery cover wherein an airflow induced by operating the vehicle is guided in and supplied to peripheries of the battery;
a cowl for covering the steering handle and the body frame over a range from upper and front sides of the steering handle to right and left sides of the body frame, said cowl being mounted to the body frame; said cowl being provided, at an upper portion covering the upper side of the steering handle, with a screen mounting recess opened at its rear end;
a windscreen inclined rearwardly and upwardly being mounted to the screen mounting recess;

side surfaces of the cowl each being provided with an air guide groove wherein an airflow is directed toward the airflow guiding-in port while being straightened; and slits for directing the airflow towards upper portions of the airflow guiding-in ports, said slits each being provided between opposed edge portions of the windscreen and the cowl that front on the screen mounting recess, and further including:

a second battery supported on a lower portion of the body frame with an opening in a lower front side of the cowl for directing an airflow for cooling said second battery.

2. The motor-driven vehicle according to claim 1, wherein a front surface of the battery cover is provided with a second airflow guiding-in port through which the airflow is guided in and supplied to peripheries of a front surface of the battery, and a front end wall of the cowl is provided with an airflow intake port by which the airflow is taken in and directed toward the second airflow guiding-in port.

3. The motor-driven vehicle according to claim 1, wherein the battery cover is provided in a rear portion thereof with an exhaust port through which the airflow guided in to the peripheries of the battery is permitted to flow out.

4. The motor-driven vehicle according to claim 2, wherein the battery cover is provided in a rear portion thereof with an exhaust port through which the airflow guided in to the peripheries of the battery is permitted to flow out.

5. A motor-driven vehicle comprising:
a front fork for supporting a front wheel with a steering handle being mounted on a top end thereof;
a body frame wherein the front fork is steerably supported;
a rear wheel supported on the body frame;
an electric motor for driving the rear wheel; a battery for supplying the electric motor with electric power; a battery cover for covering an upper side and right and left sides of the battery, with the electric motor and the battery and the battery cover being mounted on the body frame;
an airflow guiding-in port being provided in each of right and left side walls of the battery cover wherein an airflow induced by operating the vehicle is guided in and supplied to peripheries of the battery;
a cowl for covering the steering handle and the body frame over a range from upper and front sides of the steering handle to right and left sides of the body frame, said cowl being mounted to the body frame; said cowl being provided, at an upper portion covering the upper side of the steering handle, with a screen mounting recess opened at its rear end;
a windscreen inclined rearwardly and upwardly being mounted to the screen mounting recess;
side surfaces of the cowl each being provided with an air guide groove wherein an airflow is directed toward the airflow guiding-in port while being straightened; and slits for directing the airflow towards upper portions of the airflow guiding-in ports, said slits each being provided between those opposed edge portions of the windscreen and the cowl that front on the screen mounting recess,
wherein the battery cover is provided in a rear portion thereof with an exhaust port through which the airflow guided in to the peripheries of the battery is permitted to flow out, and
wherein the exhaust port is foiined wherein exhaust air flowing out therethrough is directed toward the electric motor.

6. The motor-driven vehicle according to claim 4, wherein the exhaust port is formed wherein exhaust air flowing out therethrough is directed toward the electric motor.

7. The motor-driven vehicle according to claim 5, and further including a second battery supported on a lower portion of the body frame with an opening in a lower front side of the cowl for directing an airflow for cooling said second battery.

8. The motor-driven vehicle according to claim 1, wherein the airflow directed to cool the second battery is exited to be directed to cool the electric motor disposed directly to the rear of the second battery.

9. The motor-driven vehicle according to claim 1, and further including a driver unit for controlling the driving of the electric motor, said driver unit being positioned below the second battery wherein the airflow exiting from cooling the second battery is supplied to the driver unit for cooling the driver unit and the electric motor disposed below and disposed directly to the rear of the second battery.

10. The motor-driven vehicle according to claim 1, wherein the airflow guiding-in port is a louver for opening the battery case to permit an airflow to be supplied thereto.

11. A battery case for a motor-driven vehicle comprising:
a body frame;
an electric motor mounted on the body frame;
a battery for supplying the electric motor with electric power;
a battery cover for covering an upper side and right and left sides of the battery, said electric motor, the battery and the battery cover being mounted on the body frame;
an airflow guiding-in port being provided in each of right and left side walls of the battery cover wherein an airflow induced by operating the vehicle is guided in and supplied to peripheries of the battery;
a cowl for covering the body frame over a range from upper and front sides of the vehicle to right and left sides of the body frame, said cowl being mounted to the body frame;
said cowl being provided with a screen mounting recess opened at its rear end; side surfaces of the cowl each being provided with an air guide groove wherein an airflow is directed toward the airflow guiding-in port while being straightened; and
slits for directing the airflow towards upper portions of the airflow guiding-in ports, and further including:
a second battery supported on a lower portion of the body frame with opening in a lower front side of the cowl for directing an airflow for cooling said second battery.

12. The battery case for a motor-driven vehicle according to claim 11, wherein a front surface of the battery cover is provided with a second airflow guiding-in port through which the airflow is guided in and supplied to peripheries of a front surface of the battery, and a front end wall of the cowl is provided with an airflow intake port by which the airflow is taken in and directed toward the second airflow guiding-in port.

13. The battery case for a motor-driven vehicle according to claim 11, wherein the battery cover is provided in a rear portion thereof with an exhaust port through which the airflow guided in to the peripheries of the battery is permitted to flow out.

14. The battery case for a motor-driven vehicle according to claim 12, wherein the battery cover is provided in a rear portion thereof with an exhaust port through which the airflow guided in to the peripheries of the battery is permitted to flow out.

15. The battery case for a motor-driven vehicle according to claim 13, wherein the exhaust port is formed wherein exhaust air flowing out therethrough is directed toward the electric motor.

16. The battery case for a motor-driven vehicle according to claim 14, wherein the exhaust port is formed wherein exhaust air flowing out therethrough is directed toward the electric motor.

17. The battery case for a motor-driven vehicle according to claim 11, wherein the airflow directed to cool the second battery is exited to be directed to cool the electric motor disposed directly to the rear of the second battery.

18. The battery case for a motor-driven vehicle according to claim 11, and further including a driver unit for controlling the driving of the electric motor, said driver unit being positioned below the second battery wherein the airflow exiting from cooling the second battery is supplied to the driver unit for cooling the driver unit and the electric motor disposed below and disposed directly to the rear of the second battery.

19. The battery case for a motor-driven vehicle according to claim 11, wherein the airflow guiding-in port is a louver for opening the battery case to permit an airflow to be supplied thereto.

* * * * *